United States Patent [19]

Beck et al.

[11] 3,764,963
[45] Oct. 9, 1973

[54] UNDERWATER ECHO-RANGING AND SIGNAL-RETURN CORRELATION APPARATUS

[75] Inventors: Lloyd Beck, Pasadena; Yoshiya Igarashi, Altadena; Benjamin L. Thompson, South Pasadena; Robert V. Thurman, Sierra Madre, all of Calif.

[73] Assignee: The United States of America as represented by the Secretary of the Navy, Washington, D.C.

[22] Filed: Dec. 3, 1964

[21] Appl. No.: 415,822

[52] U.S. Cl. .......................... 340/3 R, 343/100 CL
[51] Int. Cl. ............................................. G01s 9/66
[58] Field of Search ................. 343/13, 17.1, 100.7; 340/1, 3

[56] References Cited
UNITED STATES PATENTS

| 3,024,458 | 3/1962 | Cohen et al. .................. 343/17.1 R |
| 3,066,279 | 11/1962 | Marks ................................. 340/3 R |
| 3,175,214 | 3/1965 | Ramsay et al. ............. 343/17.1 R X |
| 3,212,053 | 10/1965 | Finney .............................. 340/3 R |

Primary Examiner—Richard A. Farley
Attorney—G. J. Rubens, V. C. Muller and P. H. Firsht

EXEMPLARY CLAIM

1. In an acoustic echo ranging system for detection of the presence of a target submarine and of the type which transmits a twin pulse echo ranging search signal consisting of first and second pulses having a predetermined interval of time separation therebetween; and in which the input signal received during a listening period is fed through a dual channel delay network for splitting a signal into two parallel channels and introducing a relative delay therebetween, said dual channel delay network comprising first and second parallel channels with the second channel adapted to provide a fixed delay in the transmission of the input signal therethrough which exceeds the time for transmission of the input signal through said first channel by said predetermined interval of separation betweeen the first and second pulses of the twin pulse echo ranging search signal; and in which the outputs of said first and second parallel channels are compared to detect coincidence of target relfection of the second of the twin pulses from a target in the output of the first channel with reflection of the first of the twin pulses from the same target in the output of the second channel; said echo ranging system being operative to repetitively transmit the twin pulse search signal at regular time intervals of the order of 1–2 seconds; the improvements in combination comprising:

1. means for generating a twin pulse modulation signal for application to the modulator of the echo ranging system transmitter, said twin pulse modulating signal consisting of first and second pulses having a predetermined interval of separation therebetween, said first and second pulses both being of the same predetermined pulse duration, having a value of an order of 1–2 milliseconds, said interval of separation between the first and second pulses being substantially equal to the maximum expected duration of pulse reflection signal from a target submarine which may appear in said system input signal, said maximum expected duration of pulse reflection signal being determined by the time it takes an individual pulse of the twin pulse search signal to transverse the length of a target submarine oriented substantially longitudinally along the line-of-sight from the echo ranging system, the magnitude of the maximum expected duration of pulse reflection being of an order including the value 70 milliseconds, 2. a transmitter and an associated modulator, said transmitter and modulator being operable to transmit a single frequency acoustic signal in response to said twin pulse modulation signal applied to the modulator, whereby said twin pulse modulation signal causes the system to transmit a single frequency acoustic energy twin pulse echo ranging search signal having its first and second pulses of a single frequency of acoustic energy and having pulse duration and interval of time separation characteristics corresponding to those of the modulation signal, and 3. means for demodulating the input signal operative to provide the amplitude modulation envelope of the input signal at the outputs of both the first and second channels of the dual channel delay network, 4. reflection by a target submarine of said single frequency acoustic energy twin pulse echo ranging search signal producing an input signal amplitude modulation envelope containing a sequential pair of target echo signature signals separated by said predetermined time, the individual target echo signals of said sequential pair being correlated relative to one another to a high degree in both time and amplitude of component perturbation as the result of the reflection mechanism of the twin pulses of a single frequency of acoustic energy, said high degree of correlation having a magnitude of correlation coefficient R, of an order including the range of values 0.8 to 0.9, whereby system selectivity in detection of coincidence of the first of the sequential pair of target echo signature signals at the output of the first channel with the second of the sequential pair of target echo signature signals at the output of the second channel is enhanced.

2 Claims, 6 Drawing Figures

INVENTORS.
LLOYD BECK
YOSHIYA IGARASHI
BENJAMIN L. THOMPSON
ROBERT V. THURMAN
BY
V. C. MULLER
ATTORNEY.

United States Patent [19]
Beck et al.
[11] 3,764,963
[45] Oct. 9, 1973
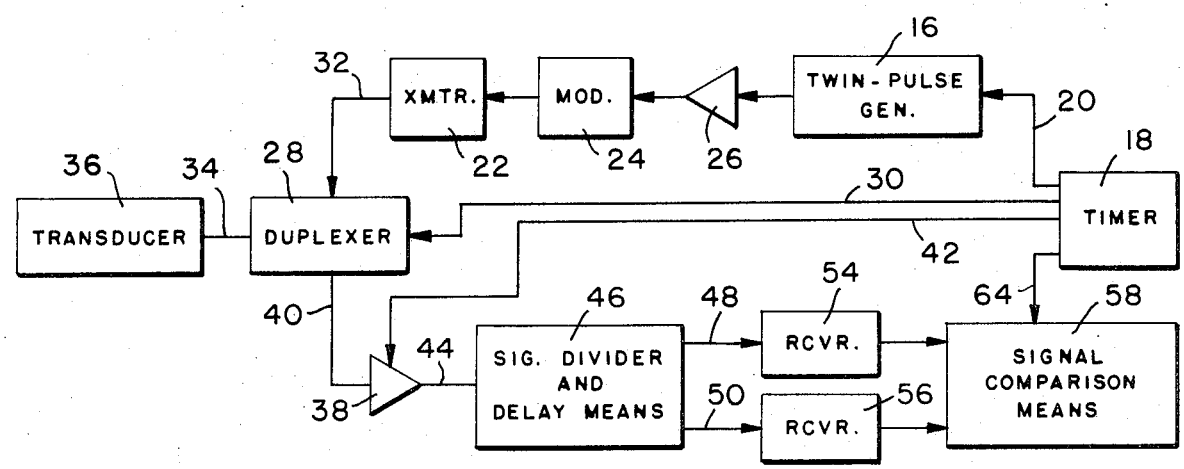

UNDERWATER ECHO-RANGING AND SIGNAL-RETURN CORRELATION APPARATUS

The invention described herein may be manufactured and used by or for the Government of the United States of America for governmental purposes without the payment of any royalties thereon or therefor.

The invention relates to underwater echo-ranging target detection systems, and more particularly to such echo-ranging systems employing a correlation technique for classification of echoes and identification of target echoes.

While it has been theoretically possible to employ certain correlation techniques in conjunction with underwater echo-ranging systems for identification or discrimination of true target echoes from spurious echoes and other background signals, this has heretofore been technically feasible and practicable only by use of comparatively complex and correspondingly expensive correlation apparatus; to extract the necessary information from successive signal returns, correlation apparatus ordinarily must include means for computing the correlation factor or coefficient corresponding to a selected correlation interval and delay time, means for rapidly trying many correlation intervals and delay times from among the very large number of possibilities, and means for presenting the resultant correlation coefficients in a manner enabling recognition of a true target echo. Further, in practice, when such correlation apparatus is employed in connection with conventional underwater echo-ranging systems in which each listening interval (of the order of one to two seconds) follows transmission of a single search-pulse, identification of true target echoes is difficult and uncertain for the reason that target echoes in successive listening intervals are generally greatly different in configuration and amplitude characteristics (resulting in low and therefore non-identifying correlation coefficient) due to the extent of changes in target aspect and in the seawater medium which take place during the comparatively long time interval between successive echoes.

The principal object of the present invention is to provide a novel, effective, yet simplified and comparatively inexpensive combination of underwater echo-ranging and signal correlation apparatus for detection and identification of true target echoes.

Other objects, advantages and novel features of the invention will become apparent from the following detailed description of the invention considered in conjunction with the accompanying drawing wherein.

In the underwater echo-ranging system of the present invention, each listening interval is initiated by generation and transmission of a sequential pair of single frequency acoustic search-pulses, such a pair here being termed twin search-pulses, these being of comparatively short duration, say 1 or 2 milliseconds, having a time-separation of say 70 milliseconds (or in any event little greater than maximum target-echo duration which is the time it takes a search-pulse to traverse a target-submarine oriented substantially longitudinally along the line-of-sight from the echo-ranging system), and the twin search-pulses recurring at a repetition period (say about 2 seconds) sufficient to accommodate the desired or available maximum range of target detection. Since the time-separation between twin search-pulses is little greater than target-echo duration, target-echos of a twin set present high similarity; the twin search-pulses traverse a target-submarine in sufficiently rapid sequence such that the configuration and amplitude characteristics of the resultant target echoes are substantially alike, that is, without differences in target signature as ordinarily occur due to comparatively large changes in target aspect and in the intervening seawater medium as take place in the very much longer intervals between repetitions of single or twin search-pulse transmissions. Continuing with reference to the twin search-pulse transmission technique, and to the signal-return resulting therefrom, the dual echoes from reflectors of limited length (such as a target-submarine) are of substantially symmetrical twin type, in any single listening interval, since target "highlights" result in corresponding target-echo highlights, or signal perturbations, which repeat with interval of the twin search-pulse separation; this is intrinsically different than the echo-return (reverberation), from what may here be termed substantially unlimited reflectors (as approximated by seawater bottom, surface, thermocline layers, other discontinuities, and scatterers suspended in the surrounding volume of seawater), wherein the signal is non-repetitive within a cycle because of the interference effects taking place between the two returns from the twin search-pulses.

Figure 1:
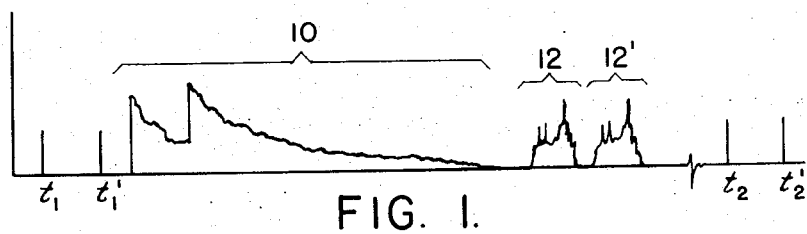
FIG. 1 shows a twin-pulse transmission and signal reception cycle in accordance with the concept and operation of the present underwater echo-ranging system.
Figure 2:
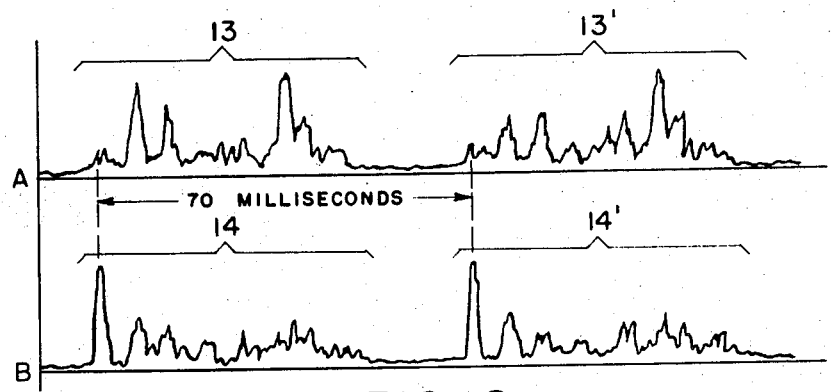
FIGS. 2A and 2B are each expanded time-scale illustrations of twin-echoes reflected from the same target-submarine, but in successive listening intervals, resulting from transmission of twin search-pulses in accordance with the present invention.

Referring now to FIG. 1 of the drawing, illustrating an output signal of a receiver unit of an underwater echo-ranging system embodying the present invention, and wherein signal return envelope amplitudes are plotted against a time axis, leakthrough replicas of the twin search-pulses are represented at $t_1$ and $t_1'$, and again (after a listening interval) at $t_2$ and $t_2'$, the twin search-pulses having time-duration, separation, and repetition period characteristics as already mentioned above. The resultant reverberation, exaggeratedly time-shortened because of illustration limitations, is indicated at 10, and the twin echoes arising by reflection of the twin search-pulses from a target-submarine are indicated at 12 and 12'. For the purpose of presenting with greater clarity the type or extent of similarity found between twin echoes as received during a single listening interval, and dissimilarity of echoes as received in even immediately successive listening intervals, FIG. 2 shows at A and B expanded views of echoes as reflected from the same target-submarine and as received in successive listening intervals; expressing the degree of similarity between echoes in terms of the correlation coefficient R as measured or computed by conventional procedures, (where R may vary from zero to unity in accordance with the degree of similarity), R for the twin echoes 13 and 13' in FIG. 2A is found to be about 0.8, and R for the twin echoes 14 and 14' in FIG. 2B is found to be about 0.91; R as measured or computed for the echoes 13 and 14 in FIGS. 2A nd 2B as received in successive listening intervals is found to be about 0.39, corresponding to a markedly lower degree of similarity.

Figure 3:
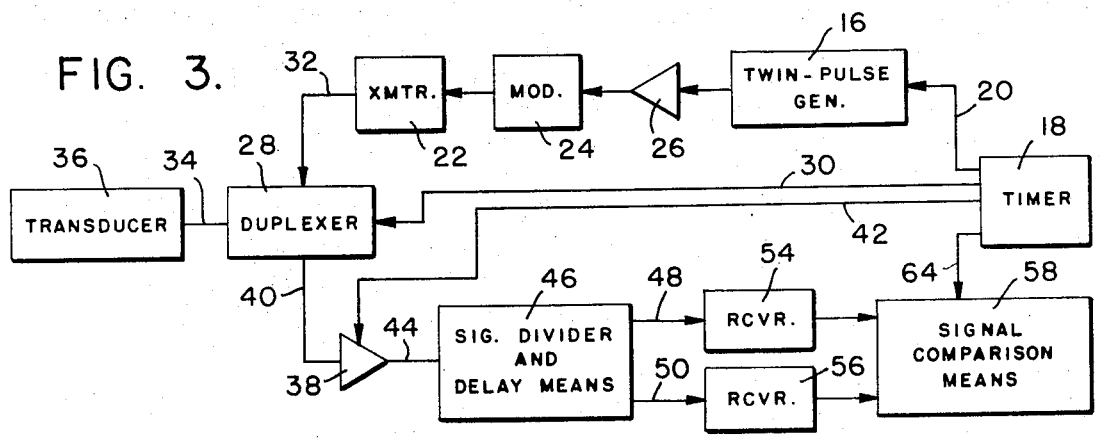
FIG. 3 is a schematic block diagram of an exemplary embodiment of the present underwater echo-ranging and signal correlation system.
Figure 5:
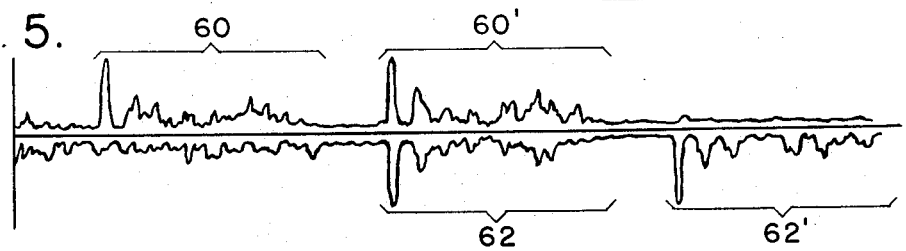
FIG. 5 depicts the time relationship between dual-channel signal returns as delivered to the signal comparison unit in the FIG. 3 embodiment of the present invention.
Figure 4:
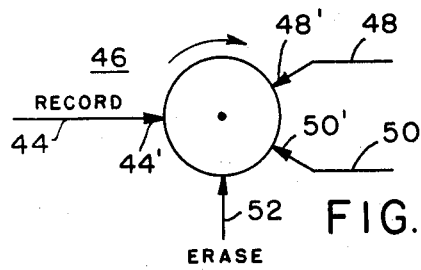
FIG. 4 illustrates one specific form in which the signal divider and delay means unit forming part of the FIG. 3 system may be provided.

FIG. 3, illustrating in simplified block diagram form an exemplary embodiment of the present underwater echo-ranging and signal correlation system, includes a signal divider and delay means unit which may for example be of the type shown in FIG. 4, and which operates to provide dual-channel signal-returns which are suitably time-spaced, as indicated in the upper and lower signal traces juxtaposed in FIG. 5, so that dual signals may be more readily and effectively compared as to degree of similarity and correlation coefficients.

Referring in greater detail to the exemplary embodiment of the invention as shown in FIG. 3, each of the block units therein may be entirely conventional except as to their employment in combination as illustrated and described. Twin-pulse generator 16 is triggered by timer 18 via lead 20 to generate a modulation signal consisting of twin-pulses having the preselected time-duration, separation and repetition interval characteristics as already described for the twin search-pulses. A conventional transmitter 22, i.e., a transmitter employing a single frequency, is controlled by modulator 24 to generate twin search-pulses in accordance with the twin pulses applied to modulator 24 from generator 16 through amplifier 26. Beginning just prior to the triggering of twin-pulse generator 16, and continuing for a period of say about 75 milliseconds in order to encompass both of the twin search-pulses, duplexer 28 is controlled by timer 18, via lead 30, to connect transmitter 22 via leads 32 and 34 to transducer 36 for transmission of the twin search-pulses into the seawater medium. Following transmission of the twin search-pulses, signal-returns received by transducer 36 are applied to amplifier 38 in the receiver channel via lead 34, duplexer 28 and lead 40. During generation and transmission of the twin search-pulses, and continuing for any preselected first period of the listening interval thereafter, amplifier 38 of the receiver section may have a blanking voltage applied thereto by timer 18, via lead 42, to eliminate receiver-channel response to reverberation during that preselected first period; amplifier 38 may further be of TVG (time-varied gain) or RCG (reverberation-controlled gain) type, in accordance with conventional practice, to initially provide reduced gain during the high-level condition of reverberation and to automatically increase the gain as the reverberation level decreases. The signal output of receiver amplifier 38 is applied through lead 44 to signal divider and delay means 46, the latter providing, at is output leads 48 and 50, substantial replicas of the amplifier 38 output signals, the signal at output lead 50, however, being delayed by the same time-interval as the time-separation between the twin search-pulses. In the simplest instance, signal divider and delay means 46 may take the form of a magnetic recorder apparatus as indicated in FIG. 4, provided with a recording head 44', circumferentially spaced dual playback heads 48' and 50', and an erase head 52, these heads here being shown schematically; as will be understood, the time delay between the signals delivered to leads 48 and 50 is simply a function of the recorder speed and the play-back head spacing and is made equal to the time separation between the twin search-pulses. Receivers 54 and 56 operate upon the signals delivered by signal divider and delay means 46 to further amplify the dual-channel signals and to extract their amplitude-modulation envelopes, applying the latter to any suitable conventional signal comparison means for determination of the degree of similarity between selected positionally aligned sections of the dual-channel signal-returns. Signal-comparison means 58 may for example be provided in the form of simply a dual-trace oscilloscope which is operable to present the delayed and undelayed dual-channel twin-echo amplitude-envelopes in the manner illustrated in FIG. 5, for visual comparison of dual echoes and estimation of the correlation coefficents R; since the delay imposed between the upper signal trace (comprising twin echoes 60 and 60') and the lower signal trace (comprising the same twin echoes but here designated 62 and 62') can be made equal to the time separation between the twin echoes, the first echo (62) of the delayed trace is positioned in vertical alignment with the second echo (60') of the undelayed trace; inversion of one of the signal traces, for greater convenience of twin echo recognition and symmetry comparison, may be accomplished, by means of conventional techniques, either in the dual-trace oscilloscope version of signal comparison means 58, or in one of the receivers 54, 56 before application to signal comparison means 58. Pulses in time-synchronism with the first of each pair of twin search-pulses may be supplied via lead 64 from timer 18 to the dual-trace oscilloscope version of signal comparison means 58 for sweep-triggering purposes, or to other versions of signal comparison means 58 for timing mark or reset purposes. Where permanent traces of twin signal-returns as received in a series of successive listening intervals may be desired, signal comparison means 58 may of course take the form of a dual-trace recorder. Further, where automatic and continuous determination of correlation coefficient R may be desired, for example for use in connection with automatic control of an associated guidance system in torpedo applications (not shown), signal comparison means 58 may take the form of a computer type of cross-correlator which in the described combination would effectively yield an auto-correlation coefficient, for the returned signal, with fixed delay equal to the twin search-pulse separation.

Having described the basic concept of the invention in terms of the foregoing exemplary embodiment, a number of other practical modifications and variations will occur to those versed in the art. For example, by use of a switching relay system controlled by timer 18, a single magnetic recorder apparatus of the type illustrated in FIG. 4 can be used in a manner linking the same delay into the transmission and reception channels, such apparatus serving during the transmission period to provide the twin-pulses required by modulator 24, and serving during the reception period to impose the described delay (equal to time-separation of the twin search-pulses) between the dual channel signal returns. As another example, for use in applications where relative target speed is sufficiently great to make the time-separation between twin target-echoes sufficiently different than the time-separation between search-pulses, conventional target-doppler sensing means may be incorporated in one of the receivers (54 or 56, FIG. 3) and used to control the speed of magnetic recorder (in that version of signal divider and delay means unit 46 in the FIG. 3 embodiment) in a manner to secure precise alignment between target echoes in the dual-channel signal returns. As another example, where the invention is to be used as an underwater echo-ranging research tool, and where apparatus simplification is desired, the signal divider and delay means unit 46 and one of the receivers can be eliminated in favor of a dual-channel dual-trace oscilloscope version of signal comparison means unit 58, which oscilloscope can itself provide the signal division and delay functions. As a further example of research tool application, the apparatus can be modified to generate and transmit the twin search-pulses at differing carrier frequencies, enabling study of target signature variations as a function of search-pulse carrier frequency.

Obviously many modifications and variations of the present invention are thus possible in the light of the above teachings. It is therefore to be understood that within the scope of the appended claims the invention may be practiced otherwise than as specifically described.

What is claimed is:

1. In an acoustic echo ranging system for detection of the presence of a target submarine and of the type which transmits a twin pulse echo ranging search signal consisting of first and second pulses having a predetermined interval of time separation therebetween; and in which the input signal received during a listening period is fed through a dual channel delay network for splitting a signal into two parallel channels and introducing a relative delay therebetween, said dual channel delay network comprising first and second parallel channels with the second channel adapted to provide a fixed delay in the transmission of the input signal therethrough which exceeds the time for transmission of the input signal through said first channel by said predetermined interval of separation between the first and second pulses of the twin pulse echo ranging search signal; and in which the outputs of said first and second parallel channels are compared to detect coincidence of target reflection of the second of the twin pulses from a target in the output of the first channel with reflection of the first of the twin pulses from the same target in the output of the second channel; said echo ranging system being operative to repetitively transmit the twin pulse search signal at regular time intervals of the order of 1–2 seconds; the improvements in combination comprising:

1. means for generating a twin pulse modulation signal for application to the modulator of the echo ranging system transmitter, said twin pulse modulating signal consisting of first and second pulses having a predetermined interval of separation therebetween, said first and second pulses both being of the same predetermined pulse duration, having a value of an order of 1–2 milliseconds, said interval of separation between the first and second pulses being substantially equal to the maximum expected duration of pulse reflection signal from a target submarine which may appear in said system input signal, said maximum expected duration of pulse reflection signal being determined by the time it takes an individual pulse of the twin pulse search signal to transverse the length of a target submarine oriented substantially longitudinally along the line-of-sight from the echo ranging system, the magnitude of the maximum expected duration of pulse reflection being of an order including the value 70 milliseconds, 2. a transmitter and an associated modulator, said transmitter and modulator being operable to transmit a single frequency acoustic signal in response to said twin pulse modulation signal applied to a modulator, whereby said twin pulse modulation signal causes the system to transmit a single frequency acoustic energy twin pulse echo ranging search signal having its first and second pulses of a single frequency of acoustic energy and having pulse duration and interval of time separation characteristics corresponding to those of the modulation signal, and 3. means for demodulating the input signal operative to provide the amplitude modulation envelope of the input signal at the outputs of both the first and second channels of the dual channel delay network, 4. reflection by a target submarine of said single frequency acoustic energy twin pulse echo ranging search signal producing an input signal amplitude modulation envelope containing a sequential pair of target echo signature signals separated by said predetermined time, the individual target echo signals of said sequential pair being correlated relative to one another to a high degree in both time and amplitude of component perturbation as the result of the reflection mechanism of the twin pulses of a single frequency of acoustic energy, said high degree of correlation having a magnitude of correlation coefficient R, of an order including the range of values 0.8 to 0.9, whereby system selectivity in detection of coincidence of the first of the sequential pair of target echo signature signals at the output of the first channel with the second of the sequential pair of target echo signature signals at the output of the second channel is enhanced.

2. A system in accordance with claim 1, the improvements further comprising:

5. means for displaying the output of the first and second parallel channels of the dual channel delay network as adjacent traces of their respective time varying amplitudes and for displaying same in a manner in which the portions of the respective channel output signals which are in time coincidence at the output ends of the channels are in juxtaposed relationship in the adjacent traces, whereby presence of a target signature echo may be detected by a visual recognition of a high degree of amplitude symmetry in coextensive linear sections of the adjacent traces.

* * * * *